United States Patent [19]

Heier

[11] 4,033,447
[45] July 5, 1977

[54] CONTAINER LINE DIVIDER

[75] Inventor: Robert J. Heier, Whitehouse, Ohio

[73] Assignee: Owens-Illinois, Inc., Toledo, Ohio

[22] Filed: Aug. 11, 1975

[21] Appl. No.: 603,410

[52] U.S. Cl. .............................................. 198/441
[51] Int. Cl.$^2$ ........................................ B65G 47/26
[58] Field of Search .............. 198/31 AA, 22, 22 B, 198/441, 601

[56] References Cited

UNITED STATES PATENTS

| | | | |
|---|---|---|---|
| 2,363,189 | 11/1944 | Magnusson | 198/31 AA |
| 3,517,794 | 6/1970 | Babunovic | 198/31 AA |
| 3,717,239 | 2/1973 | Carter | 198/31 AA |

Primary Examiner—Evon C. Blunk
Assistant Examiner—Douglas D. Watts
Attorney, Agent, or Firm—J. R. Nelson

[57] ABSTRACT

A conveyor apparatus for handling containers such as glass bottles, at high rates of production, including a single straight line pocket chain conveyor carrying containers in a single line into a line dividing mechanism at a transfer zone over a second, wide conveyor. The second conveyor crosses the path of the pocket chain conveyor at an obtuse angle on the order of 115°. The divider mechanism comprises two rotary cams operated synchronously, their lobes being in mesh with each other and each having alternating shallow and deep lobes thereon for contacting the containers in removing them from the pocket chain into two lines on the second conveyor. The divider mechanism prevents container-to-container contact in the mechanism, and this is especially important for glass containers. The pocket chain and cams are driven synchronously to cooperate in the transfer zone for forming the two lines of containers from the single line that is delivered. Each container is under positive control of the mechanism.

5 Claims, 3 Drawing Figures

CONTAINER LINE DIVIDER

The present invention relates to a mechanism in handling containers such as bottles and jars, for dividing a single line of containers into two lines of containers.

BACKGROUND OF THE INVENTION

The feeding of containers between various machines in a bottling plant often requires forming the single line high rate output from one machine into two single lines of containers to other machines operating at much lower speeds. Also, the container output of labelling machines, which may be relatively slow, may be advanced in a single line to a wrap machine or a packing machine where the containers are divided into two lines and wrapped into six or eight pack groups and loaded into a case, or the two lines are transferred in bottle groups into a case, such as a partitioned carton. Much of the bottle handling being done in performing these operations abraids or abuses the containers — especially true of glass bottles — which affects their appearance, strength and durability.

SUMMARY OF THE INVENTION

In the container handling invention herein disclosed, the containers are furnished in a high speed line and placed under positive control preventing container-to-container contact while handling in the high speed single line and dividing that line into two single lines.

Containers are carried in a pocket chain traveling in a straight line into a divider mechanism. The containers are separated one from the other by the pockets of the pocket chain conveyor and moved in a line along a straight guide rail extending up to the divider. The divider comprises a contoured circular cam having plural lobes spaced about its periphery which allows alternate containers to pass through the cam in contours disposed between the lobes thereof without contact. The other containers (every other one) are cammed out of their chain pockets by this first cam. On the opposite side of the pocket chain there is a second contoured circular cam which receives those containers cammed out of the chain pockets by the first cam and carries them to a release point on a horizontal conveyor or beltlike surface running away from the divider point. The second cam also holds the alternate bottles in the pocket conveyor not allowing them to fly out of the chain pockets at the point of entry whereat the straight guide rail must terminate to allow the line dividing function. The first and second cams are timed mechanically together off the same drive shaft and run at meshing operating speed synchronized with the pocket chain conveyor. Suitable stationary guides disposed over the horizontal belt surface align the containers within each of the two rows formed on the horizontal belt conveyor.

The invention enables high speed rates of handling the containers in the single line dividing it into two separate lines on a horizontal span of conveyor while keeping them under positive control utilizing the combined mechanism of the invention, to be presently described in detail, which prevents any container-to-container contact while doing the dividing and line forming functions.

Moreover, the apparatus of the present invention is simple and easily maintained with a minimum of wear and down time for replacement of components because of wear.

Other features and advantages of this invention will become apparent in the following disclosure of one embodiment of the invention, which teaches a contemplated best mode of construction, reference being directed to the accompanying drawings which will be described hereinafter.

DESCRIPTION OF THE APPARATUS

Figure 1:
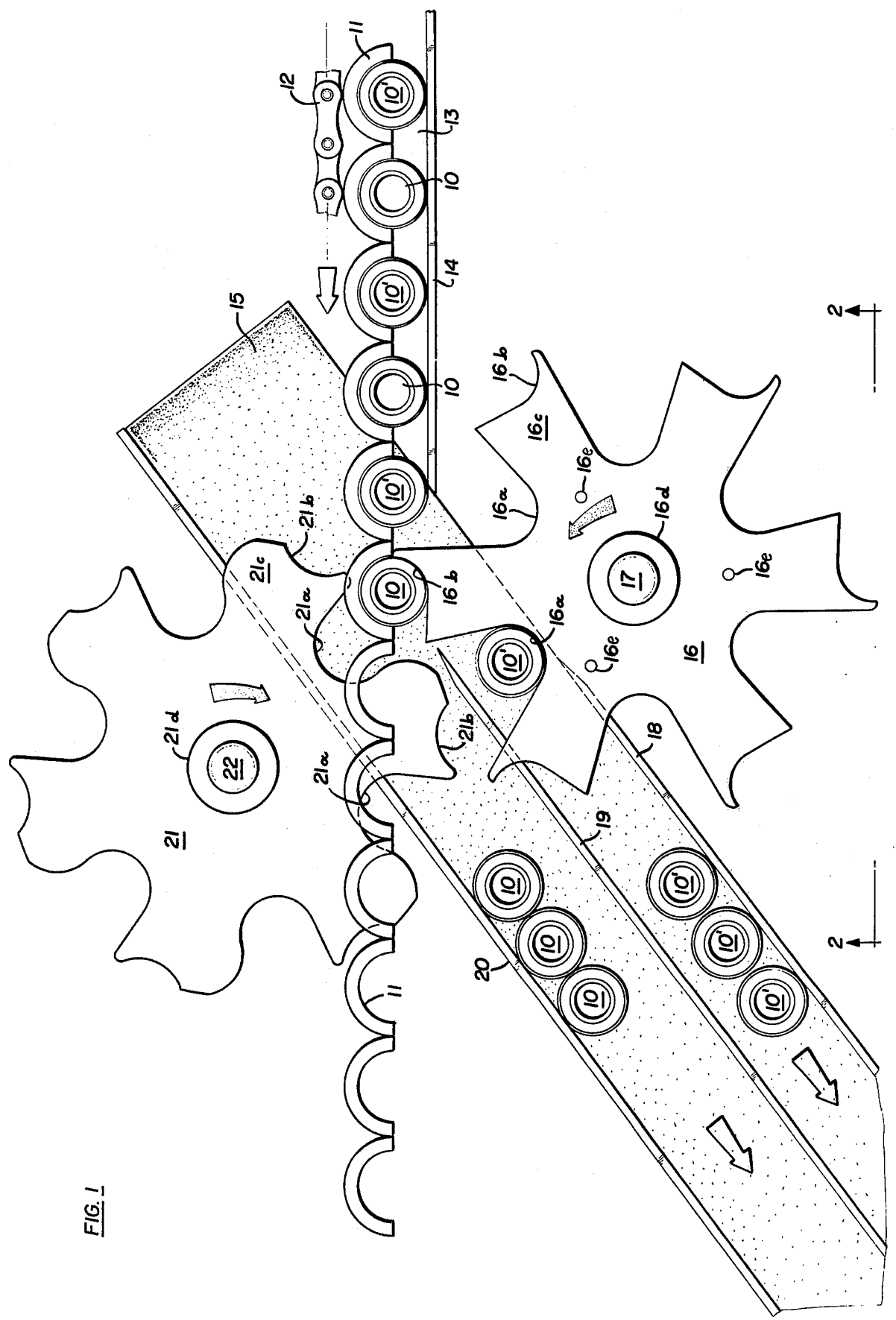
FIG. 1 is a plan view of the invention illustrating transfer of containers from a single line in a pocket chain into two single lines on a flat top conveyor.

Referring to FIG. 1, containers 10, which are shown herein in the form of glass bottles, are conveyed from right to left in the side open, C-shaped pockets 11 coupled along link chain 12. Chain 12 is driven in its endless path (not shown) which includes the straight line segment shown on the drawing (FIGS. 1 and 3) and the endless path is prescribed by several sprockets, such as the drive sprocket 9 shown on FIG. 3, engaging chain 12 to drive it for carrying the pockets 11 to a place or machine station (not shown) for loading the containers 10 into the seriatim series of pockets by known means. As indicated schematically on FIG. 3, the drive for the chain 12 is by teeth of gear 9 which receives clockwise driving rotation from motor 25 through a drive connection 34. The containers 10 are supported by an underlying belt or surface 13 (FIG. 2) driven at the speed and direction of chain 12 and extending along a parallel side rail 14 which serves as a straight guide means holding the containers in the pockets 11 in this segment of the travel of pocket chain 12 as it approaches a transfer zone over the belt 15. The chain 12 extends beyond the support surface 13 and intersects a flat top belt 15 leading into the transfer zone for the line dividing mechanism operation. For the sake of identification of bottles in the pocket chain conveyor which will be divided into the two lines on belt 15, the bottles are alternately identified as 10 and 10'. The C-shaped, side open pockets and side rail 14 provide a means for conveying the bottles 10, 10' into the transfer zone without bottle-to-bottle contact, as distinguished from conventional handling of bottles employed in a bottling plant. As the bottles serially are carried onto belt 15, they are pulled laterally over the belt 15 by their chain pockets 11. Belt 15 is power driven by the usual means and at a desired speed for production needs in the direction of the arrow, i.e. diagonally top-toward-bottom on FIG. 1, in a divergent direction at an obtuse angle with respect to the pocket chain conveyor 12. The combined lateral movement imparted to bottles 10 over belt 15 by pocket 11 with the forward oblique (obtuse angular) movement of belt 15 in relation thereto results in the bottle 10 walking out of pocket 11 beyond the terminal end of rail 14.

A contoured, rotary, circular cam member 16 is supported and driven by a vertical shaft 17, positioned for operation in the bottle transfer zone. The contoured lobes of cam 16 are operative next to the pocket conveyor line of travel. The timing of cam 16 is regulated to the speed of chain 12 by their common drive connections to motor 25 such that certain bottles indicated as 10' are carried into the deep contoured lobes 16a of cam 16. These deep lobes 16a are also referred to as secondary lobes of the circular cam 16, the first cam of the apparatus referred to herein. Circular cam 16 also includes the shallow contoured lobes 16b referred to as primary lobes of cam 16 which are contoured along the outer peripheral surface of the cam spokes 16c. These lobes 16b function to engage alternately the bottles indicated 10. Referring to bottles 10', they are force driven on conveyor 15 to pass into deep lobes 16a virtually untouched and are held in lobes 16a for placement into a line of bottles being formed downstream of the first circular cam 16 on the surface of belt 15. This row of bottles forms itself between the outer guide rail 18 along the side of belt 15 and the center guide rail 19 supported by suitable means in a vertically spaced relationship over the top of belt 15 of about one-half a bottle height. Another separate line of bottles will be formed in a manner to be described presently, and, such line of bottles is placed on belt 15 downstream in the transfer zone between the aforementioned center guide rail 19 and the other outer guide rail 20 mounted along the opposite edge of belt 15 from the guide rail 18. Preferably, the guide rails 18, 19 and 20 are parallel; however, control of movement of the lines of bottles on conveyor belt 15 may be accomplished by contouring the rails to a divergent or convergent path, as desired.

A second contoured circular cam 21 is supported and driven by vertical shaft 22 on the opposite side of belt 15 from shaft 17. Although the contours are slightly altered, circular cam 21 also has primary (deep) lobes 21a and secondary (shallow) lobes 21b alternately spaced around the cam. These lobes 21a and 21b cooperate with the primary and secondary lobes 16a and 16b of the first circular cam in a manner to be described for dividing the line of bottles 10, 10' in pocket chain 11, 12 into the two lines of bottles 10 and 10', respectively, downstream on the belt 15.

Figure 2:
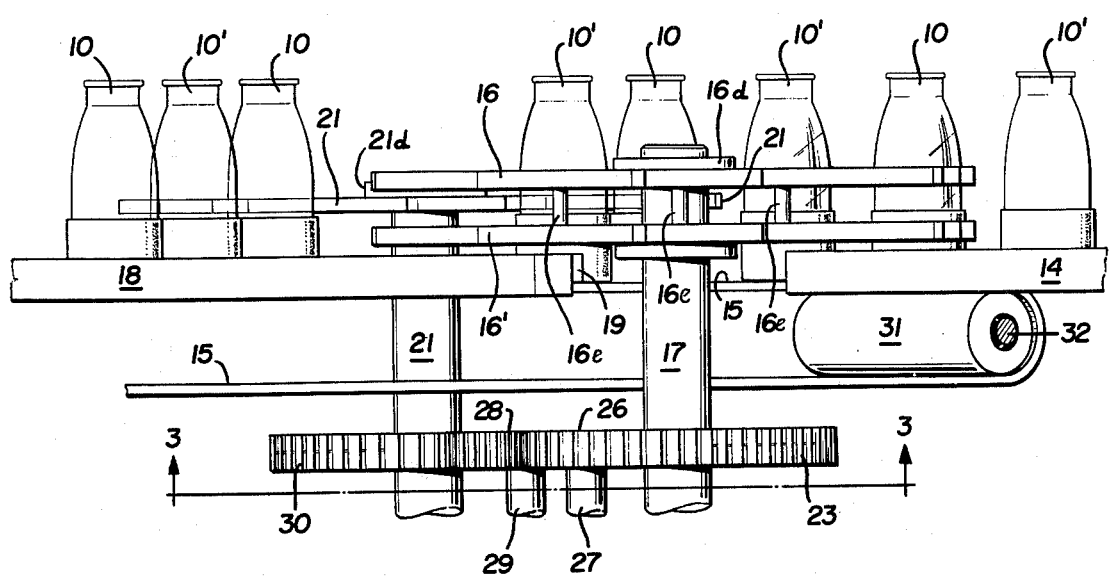
FIG. 2 is a side elevational view taken along line 2—2 on FIG. 1.
Figure 3:
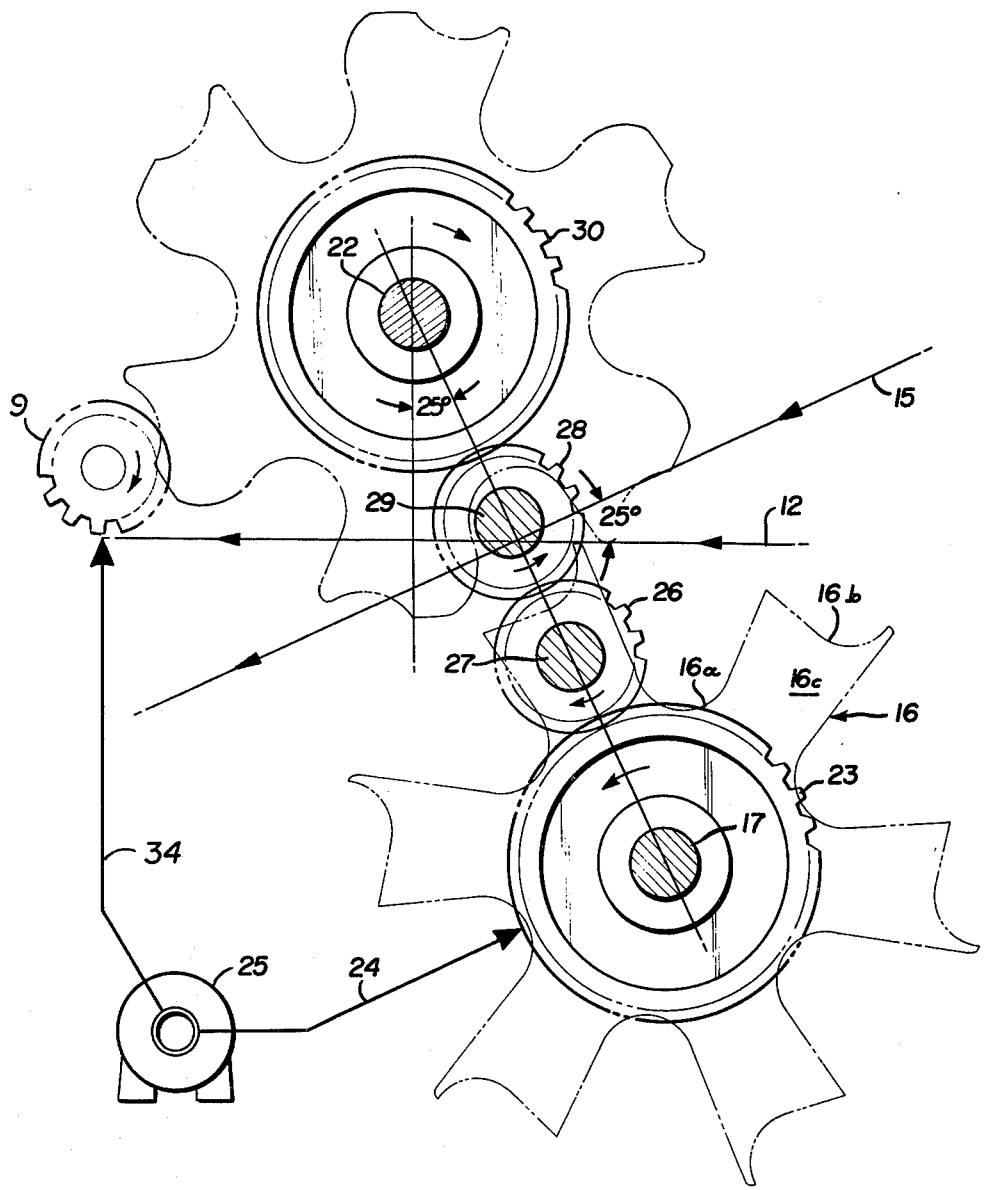
FIG. 3 is a sectional plan view, in part schematic, of the drive train for the two container control cams taken along line 3—3 on FIG. 2, and showing the outline of the container control cams in phantom line.

Referring for the moment to FIGS. 2 and 3, shafts 17 and 22 are timed for synchronized movement together by the gear 23 keyed on shaft 17 receiving power through a suitable drive connection 24 (schematically shown) with electric motor 25. Gear 23 is in mesh with a first idler gear 26 on a vertical shaft 27 supported in a lower frame (not shown) which in turn meshes with a second idler gear 28 on its vertical shaft 29 similarly supported. The second idler gear 28 meshes with the gear 30 on shaft 22 to complete the power train for rotating shafts 17 and 22 synchronously together and in opposite directions of rotation (see arrows on FIG. 3) for synchronous operation of the rotary cams 16, 21. The position of the contoured lobes on the circular cams 16 and 21 are fixed, such as shown best on FIG. 3, so that the shallow lobes 16b of cam 16 and deep lobes 21a of cam 21 are disposed opposite each other along the common diameter of the cams intersecting the centers of shafts 17 and 22. In between the lobes 16b and 21a at this point there is a bottle 10 in its chain pocket 11. Lobe 16b of the first cam 16 engaged this bottle 10 and intercepted it about the time bottle transferred onto belt 15 at the terminal end of guide rail 14 so that cam 16 by the lobe 16b has carried bottle 10 across belt 15 and controls it to insert the bottle into contoured lobe 21a of cam 21. The lobe 21a assures the control over bottle 10 to enable it, after clearing to the other side of center rail 19, to "walk" out of lobe 21a by the movement imparted by belt 15 and into the second line of bottles downstream of the line dividing station.

As described above, the lobes of the first and second circular cams cooperate in a manner that the primary lobe of one of the cams operates in time with an opposite secondary lobe of the other cam. Since these lobes are alternately disposed on the two cams they continually control the dividing of the serially arranged bottles from a single line when carried by the pocket chain into two lines of bottles when carried by the belt conveyor.

As shown on FIG. 2, circular cam 16 is comprised of two, spaced, (upper and lower) parallel identical contoured cam plates 16 and 16' fastened to a hub 16d that is fixed on shaft 17. Vertical spacer studs 16e are provided between the spokes 16c of the upper and lower cam plates. The cam 21 is comprised of a single contoured cam plate 21 fastened to a hub 21d that is fixed on shaft 22. The flat belt conveyor 15 is reeved about two end pulleys, one being shown at 31 supported in a center shaft 32 that is supported by bearings in the frame (not shown). Power to drive the belt is applied to one of the pulley shafts, such as 32, by a motor, belt or chain drive of conventional type (not shown) and the speed of conveyor belt 15 is set to a desired rate in handling the need of bottles delivered by the pocket chain conveyor.

The movement of pocket chain 12 is synchronized with cams 16, 21 by the drive connection 34 (schematically illustrated) between the drive sprocket 9 therefor and the motor 25. Since motor 25 drives both the cams 16, 21 and pocket chain conveyor 12, the synchronization of these elements of the mechanism is assured. Suitable other synchronous drive systems, known to those skilled in the art, may be alternatively utilized.

In its preferred form, the pocket chain conveyor 11, 12 intercepts the line of movement of the belt conveyor at an angle of about 25° (FIG. 1, the angle of intercept being measured from the upstream center line of belt 15 at the point of intersection with pocket chain 12). The line between centers of shafts 17, 22 is at an angle of about 25° to the perpendicular of the line of travel of belt 15. The alternate containers 10' are cammed out of pockets 11 of chain 12 by the shallow secondary cam lobes 21b and along the belt 15 to pass through with the rotation of the deep, primary cam lobes 16a. The other alternate containers 10 are engaged by the shallow secondary cam lobes 16b just as they exit from the terminal end of rail 14 and are held by the cam 16b in the pocket 11 until the container is beyond (past) the upstream end of center rail 19. Cam 16b prevents the container from running out of the pocket chain prematurely, and after center rail 19 is passed, container 10 fits into deep primary lobes of 21a of circular cam 21.

The bottles 10 or 10', should they have any tendency to follow with the cam lobes (either 21a or 16a) are wiped off of the cam by the fixed guide rails, at either 20 (in the case of a cam lobe 21a) or at 18 (in the case of a cam lobe 16a).

The best mode known to me for carrying out the invention has been described above in terms sufficiently full, clear, concise and exact as to enable one skilled in the art to use the same. It is understood that other and further modifications of the described apparatus and mode of practicing the invention can be made by one skilled in the art without departing from the principles or scope of the invention; and, it is, therefore, desired to limit the invention only in accordance with the appended claims.

The invention is claimed as follows:

1. Container handling apparatus for transferring containers comprising a first horizontal straight line conveyor movable at a substantially uniform speed in one direction including a side-open pocket chain having the pockets at equally spaced intervals therealong and adapted to carry containers in a straight line, a guide means adjacent the first conveyor and spaced opposite said open side of the pockets for retaining containers in the pockets, a second horizontal conveyor means at the same elevation as said first conveyor and including a straight section movable across the path of the first conveyor at an obtuse angle, said pocket chain conveyor extending across said second conveyor means, the second conveyor means adapted to be driven in a diverging direction away from the side open pockets and at obtuse angular relationship with said chain conveyor, said guide means terminating adjacent said second conveyor means permitting containers to leave said side open pockets thereafter upon being carried onto said second conveyor means, a first horizontal rotary cam member carried on a vertical shaft mounted for rotation and spaced from the side open pockets and in the direction of movement of the second conveyor means, said first cam having alternating primary and secondary lobes, the primary lobes engaging alternate containers in the side open pockets as they pass the terminal end of the guide means and retaining them in said pockets until carried to a first position on the second conveyor means by the side open pockets, whereupon rotary movement of the first lobes away from the path of the pocket chain releases the containers for egress from their said pockets for thereafter conveying them in a first line on the second conveyor means, and the secondary lobes of said cam permit alternate containers in said chain pockets to be released therefrom at a second position on the second conveyor means, said second lobes restraining such containers at said second position during cam rotation to release them in a second line spaced from said first line on the second conveyor means, a second horizontal rotary cam member carried on a vertical shaft mounted for rotation on the opposite side of the pocket chain from said first cam, said second cam having primary and secondary lobes, the primary lobes adapted to engage containers in the chain pockets and guide them to said second position on the second conveyor means and the secondary lobes adapted to receive containers retained in the pockets by the primary lobes of the first cam to guide them to said first position on the second conveyor means, means connected to the shafts of said first and second cam members for driving them in opposite directions of rotation and in synchronism, a center guide member, and means mounting said guide member longitudinally of the second conveyor intermediate the first and second lines of containers formed thereon, the guide means extending from the transfer zone on the second conveyor and in the downstream direction thereon.

2. The container handling apparatus of claim 1, including a drive motor, and means connecting the drive motor and the pocket chain for driving the latter, and the means connected for driving the first and second cam means also including a connecting means with said drive motor for also driving said first and second cams at synchronous speed thereby, the pocket chain and first and second cam means being driven in synchronism.

3. The container handling apparatus of claim 1, wherein the obtuse angular relationship between the movement of the first conveyor and the second conveyor is approximately 115°.

4. In a container handling apparatus, the improvement including a pair of container moving conveyors constantly moving to intersect one another in a container transfer zone, the first conveyor bringing containers to transfer to the second conveyor that is moving divergingly across the path of the first conveyor at an obtus angle, a pocket chain moving with the first conveyor having side open pockets for carrying containers in a single line to the container transfer zone, the pockets opening toward the movement of the second conveyor, a rotary cam means operable in the transfer zone adjacent the side opening of the pockets on said chain which comprises a first rotary cam having alternate shallow and deep contoured lobes about its periphery, a second rotary cam having alternate shallow and deep contoured lobes about its periphery, means rotatably supporting the first cam on one side of the first conveyor and at the open side of the pockets thereof, means rotatably supporting the second cam on the opposite side of the first conveyor, said first cam being operable to engage certain of the containers in the transfer zone and retain them in said pockets of the chain to be carried thereby to a first line position on the second conveyor, whereat they are released for movement with the second conveyor in a first line thereon, and said second cam being operable to receive the other of the containers carried by the pocket chain in the transfer zone upon their exit from the chain pocket and guide them on the second conveyor to a second line position spaced transversely from said first line position thereon, whereat they are released for movement with the second conveyor in a second line thereon, drive means connecting the first and second cams for rotating them in opposite directions such that the lobes thereof move in a direction in the transfer zone with the first conveyor, the shallow lobes of one of the said first and second cams cooperating with the deep lobes of the other in transferring containers from the first conveyor into one of the two lines on the second conveyor, said drive means comprising a drive motor and means connecting said motor to drive the first conveyor and the first and second rotary cams in unison and at a synchronized speed for transferring containers from the pockets of the first conveyor into two lines of containers on the second conveyor, and a centrally disposed guide member mounted in overlying relationship on the second conveyor and disposed longitudinally thereof adjacent the transfer zone in the direction of travel of said second conveyor between the second and first lines of containers formed thereon.

5. The container handling apparatus of claim 4, wherein the movement of the second container divergently across the path of the first conveyor is at an angle of approximately 115°.

* * * * *